United States Patent [19]

Musselman et al.

[11] Patent Number: 5,085,746

[45] Date of Patent: Feb. 4, 1992

[54] METHOD OF FABRICATING SCANNING TUNNELING MICROSCOPE TIPS

[75] Inventors: Inga H. Musselman, Durham; Phillip E. Russell, Apex, both of N.C.

[73] Assignee: North Carolina State University, Raleigh, N.C.

[21] Appl. No.: 579,892

[22] Filed: Sep. 10, 1990

[51] Int. Cl.$^5$ .......................... C25F 3/02; C25F 3/16
[52] U.S. Cl. .................. 204/129.4; 204/129.55; 204/129.75; 156/625
[58] Field of Search ........... 204/129.4, 129.55, 129.75; 156/654, 625

[56] References Cited

U.S. PATENT DOCUMENTS

| | | | |
|---|---|---|---|
| 2,430,028 | 11/1947 | Pfann et al. | 204/129.55 X |
| 2,607,724 | 8/1952 | Laing | 204/129.4 X |
| 3,524,803 | 8/1970 | Rannefeld | 204/142 |
| 3,556,953 | 1/1971 | Schulz | 204/129.4 X |
| 4,375,396 | 3/1983 | Beggs et al. | 204/129.55 X |
| 4,452,677 | 6/1984 | Richardson | 204/129.75 X |
| 4,469,554 | 9/1984 | Turner | 204/129.75 X |
| 4,473,771 | 9/1984 | Lhotsky et al. | 313/336 |

FOREIGN PATENT DOCUMENTS

| | | | |
|---|---|---|---|
| 47-36194 | 9/1969 | Japan | 264/129.55 |
| 0205939 | 8/1989 | Japan | 156/625 |

OTHER PUBLICATIONS

Sybalsky, J., IBM Technical Disc. Bull., vol. 13, #12, May 1971, "Protective Atmosphere For Basic Etch Sol'ns".

Allan J. Melmed, Helium Field-On Microscopy of Hexagonal Close-Packed Metals, Surface Science 8(1967), 191–205.

Field Ion Microscopy, American Elsevier Publishing Co., Inc., New York, pp. 119–127.

Journal De Physique, O. Nishikawa, Field Ion Microscope and Atom-Probe Studies of Scanning Tunneling Microscope Tips, pp. C6-55-C6-59.

Andrew A. Gewirth, J. Electroanal. Chem. 261 (1989), pp. 477–482, Fabrication and Characterization of Microtips For In Situ Scanning Tunneling Microscopy.

Ruth Nicolaides, J. Vac. Sci. Technol. A6(2), Mar.-/Apr. 1988, pp. 445–447, Scanning Tunneling Microscope Tip Structures.

M. Gehrtz, J. Vac. Sci. Technol. A6(2), Mar./Apr. 1988, pp. 432–435, Scanning Tunneling Microscopy of Machined Surfaces.

Michael J. Herben, Journal of Microscopy, vol. 152, Pt. 3, Dec. 1988, pp. 651–661, Preparation of STM Tips For In-Situ Characterization of Electrode Surfaces.

C. T. J. Ahlers, J. Appl. Phys. 38(2), Feb. 1967, Electropolishing of Platinum Foils at $-35°$ C. for Transmission Electron Microscopy.

*Primary Examiner*—Donald R. Valentine
*Attorney, Agent, or Firm*—Bell, Seltzer, Park & Gibson

[57] ABSTRACT

A method of fabricating a double-tapered scanning tunneling microscope comprises (a) immersing one end of the tip in a bath of an acidic aqueous etchant solution containing an alkaline earth salt, with the wire positioned substantially perpendicularly to the surface of the solution; and (b) etching the wire at about 25 volts root mean squared (rms) alternating current (ac) until a double-tapered tip is formed thereon. The etching step is preferably followed by a polishing step which comprises (c) providing a thin film of a second acidic aqueous etchant solution containing an alkaline earth salt; then (d) contacting said electrode tip to the thin film: and then (e) etching the tip at about 2 volts rms ac to thereby polish the tip.

Also disclosed is a method inhibiting the formation of carbon on a scanning tunneling microscope tip which comprises (a) positioning a wire in an etchant solution and then (b) etching the wire while excluding carbon dioxide therefrom.

Double-tapered scanning tunneling microscope tip comprised of an elongate wire and methods of using the same are also disclosed.

28 Claims, 3 Drawing Sheets

METHOD OF FABRICATING SCANNING TUNNELING MICROSCOPE TIPS

This invention was made with government assistance under NSF grant No. DMR-8657813. The government may have certain rights to this invention.

FIELD OF THE INVENTION

This invention relates to scanning tunneling microscope tips, and methods for making and using such tips.

BACKGROUND OF THE INVENTION

The scanning tunneling microscope (STM) can provide high resolution three-dimensional (3D) images of the surface topography of conducting samples. STM has been used extensively to study surface structure at the local atomic level. With its high lateral and vertical resolution, STM can also reveal important topographic details within larger scale structures, which cannot be resolved by conventional measurement techniques.[1] For example, the usefulness of STM has been demonstrated for diamond-turned samples,[1,2] ruled grating replicas,[2] x-ray reflecting optics,[3] and optical disks.[4-6] Many of these precision surfaces have features ranging from 10 to 1,000 nm in height and less than 2 μm in width.

Tips for STM have been prepared using several fabrication techniques, the most common of which include electrochemical etching and mechanical shearing. Many electrochemical polishing procedures, solutions, and conditions appropriate for tip specimen preparation in field ion microscopy (FIM) are also applicable for STM tips.[7] Tungsten tips, which fulfill the STM instrument requirement of being stiff, have been used to a great extent to image specimens.[8] The presence of an aqueous oxide layer, however, makes it difficult to acquire STM images with these tips unless the surface oxide is removed by evaporation in an ultrahigh vacuum (UHV) system just prior to imaging in vacuum, by annealing before imaging in air, or by sputtering in an ion mill.[9] Platinum, although a softer metal, is a preferable material to W because it is inert to oxidation. The addition of Ir to form a Pt/Ir alloy adds stiffness while maintaining a chemically inert material. Tips of Pt/Ir have been electrochemically etched in solutions of $CaCl_2/H_2O/HCl$[10] or $KCl/H_2O/HCl$[7], $NaCN/KOH$,[11] and molten $NaNO_3/NaCl$.[12]

Other STM tip preparation methods have been reported. Reproducible sharp-pointed Mo tips can be prepared by controlling the applied ac voltage, wave shape, phase angle, frequency, and number of waves.[13] Ion milling[14] and field ion microscopy (FIM)[15] techniques have been used to prepare tips from single crystal W. Tips capable of achieving atomic resolution on graphite include pencil lead,[16] colloidal graphite-coated tungsten,[16] and cut Pt/Ir wire (available from Digital Instruments Inc.). The cut tips, although variable in shape, produce good quality images from samples with atomic level topography, e.g., graphite and thin metal films.[17]

Although resolution requirements are usually not as stringent for highly topographic samples, wide area scans place unique restrictions on tip morphology. For such samples, symmetric, controlled geometry tips with small radii of curvature and high aspect ratios are necessary to minimize the convolution of the tip shape into the acquired image. In addition, specially shaped tips are desireable for large feature imaging. For example, a tip 500 Å in radius with a 15° cone half angle cannot resolve a square-bottomed groove as well as a tip 500 Å in radius with a 5° cone half angle. On the other hand, tips which have too small a cone half angle might be mechanically fragile and prone to vibration. Comparatively little attention has been devoted to optimizing tip geometry for STM.

SUMMARY OF THE INVENTION

Methods of fabricating double-tapered scanning tunneling microscope tips from a wire formed from platinum, iridium, or a platinum/iridium alloy, and tips made by the method, are disclosed. The method comprises (a) immersing one end of the wire in a bath of an acidic aqueous etchant solution containing an alkaline earth salt, with the wire positioned substantially perpendicularly to the surface of the solution; and (b) etching the wire at about 25 volts root mean squared (rms) alternating current (ac) in a first etching step until a double-tapered tip is formed thereon. The etching step is preferably followed by a polishing step which comprises (c) providing a thin film of a second acidic aqueous etchant solution containing an alkaline earth salt; then (d) contacting said electrode tip to the thin film: and then (e) etching the tip at about 2 volts rms ac to thereby polish the tip. Unlike tip preparation by FIM or ion milling, the method described herein is simple, fast, and inexpensive. In addition, the procedure uses innocuous chemicals ($CaCl_2/H_2O/HCl$) unlike the alternative cyanide[11] or molten salt etchants.[12]

A second aspect of the present invention is a method of inhibiting the formation of carbon on a scanning tunneling microscope tip during etching thereof. This method comprises (a) positioning a wire in an etchant solution, which wire is formed from platinum, iridium, or a platinum/iridium alloy; and then (b) etching the wire while excluding carbon dioxide therefrom.

A third aspect of the present invention is a double-tapered scanning tunneling microscope tip. The tip is comprised of an elongate wire. The wire has a diameter of from about 0.1 to about 0.5 millimeters and is formed from platinum, iridium, or a platinum/iridium alloy. An intermediate conical portion is formed at one end of said elongate wire. An end conical portion is formed at the apex of said intermediate conical portion and axially aligned therewith, with the intermediate conical portion having a cone half angle greater than the end conical portion. The end conical portion has a cone half angle of from about 5 to about 10 degrees. A tip formed at the apex of said end conical portion has a radius of curvature of about 500 Å.

A fourth aspect of the present invention is a method of conducting scanning tunneling microscopy in which a microscope tip is positioned adjacent the surface of a conducting sample, a voltage applied to the tip, the tip moved across the surface of the sample, and the tunneling current between the tip and the sample detected. This method employs a double-tapered scanning tunneling microscope tip. The tip comprises an elongate wire having a diameter of from about 0.1 to about 0.5 millimeters. The wire is preferably formed from a noble metal or an alloy of noble metals. An intermediate conical portion is formed at one end of the elongate wire. An end conical portion is formed at the apex of the intermediate conical portion and axially aligned therewith. The intermediate conical portion has a cone half angle greater than the end conical portion, and the end conical portion has a cone half angle of from about 5 to about 10 degrees. A tip formed at the apex of the end conical portion has a radius of curvature of about 500 Å.

DETAILED DESCRIPTION OF THE PREFERRED EMBODIMENTS

The electrochemical etching procedure described herein enables one to fabricate controlled geometry tips for STM. By combining bulk etching and micropolishing techniques in a $CO_2$ free environment, tips that are chemically "clean" and inert to oxidation can be formed having a high aspect ratio (5°-10° cone half angle) and a small radius of curvature (~500 Å). Although capable of acquiring atomic resolution images, these tips are especially useful for the imaging and metrology of precision engineered surfaces. Using the tips described herein, the study of surface roughness can be extended to microareas in crevices previously inaccessible with cut tips. As STM is applied to samples of industrial importance such as lithographic patterns, storage devices, and optical surfaces, the tips described here will enable imaging with minimal tip artifacts.

The term "cone half angle" as used herein means the angle between the longitudinal axis of a cone and the surface of the cone.

Wire used to practice the present invention is preferably formed from platinum, iridium, or a platinum-/iridium alloy. Particularly preferred are platinum-/iridium alloys containing at least 10% by weight iridium, and iridium. Currently most preferred is a wire formed from an alloy consisting essentially of 80% by weight platinum and 20% by weight iridium. The wire may have a diameter of from about 0.1 to about 0.5 millimeters, and more preferably may have a diameter of from about 0.20 to about 0.25 millimeters. The length of the wire is not critical: we use a blank 1.25 centimeters long. The wire should be of a length sufficient to permit the free end of the wire to be immersed in the etchant bath a depth of from about 1.5 to about 2.0 millimeters.

Etchant solutions employed in practicing the present invention are aqueous solutions, and more particularly acidic aqueous solutions containing an alkaline earth salt (e.g., a chloride salt such as KCl or $CaCl_2$). Preferably the alkaline earth salt is $CaCl_2$, and preferably the solutions are rendered acidic by including HCl therein. The etchant solution for the bulk etching and second polishing step may be the same or different: we use the same. The currently preferred etchant solution is comprised of, by volume, 60% aqueous saturated $CaCl_2$ solution, 36% $H_2O$, and 4% 12 Molar HCl solution (Fisher Scientific, Inc., A-144 C). The aqueous saturated $CaCl_2$ solution is prepared by dissolving 74.5 grams of $CaCl_2$ (Fisher Scientific, Inc., C-614 calcium chloride, anhydrous pellets) in 100 milliliters of water. All water employed is single distilled.

Figure 1:
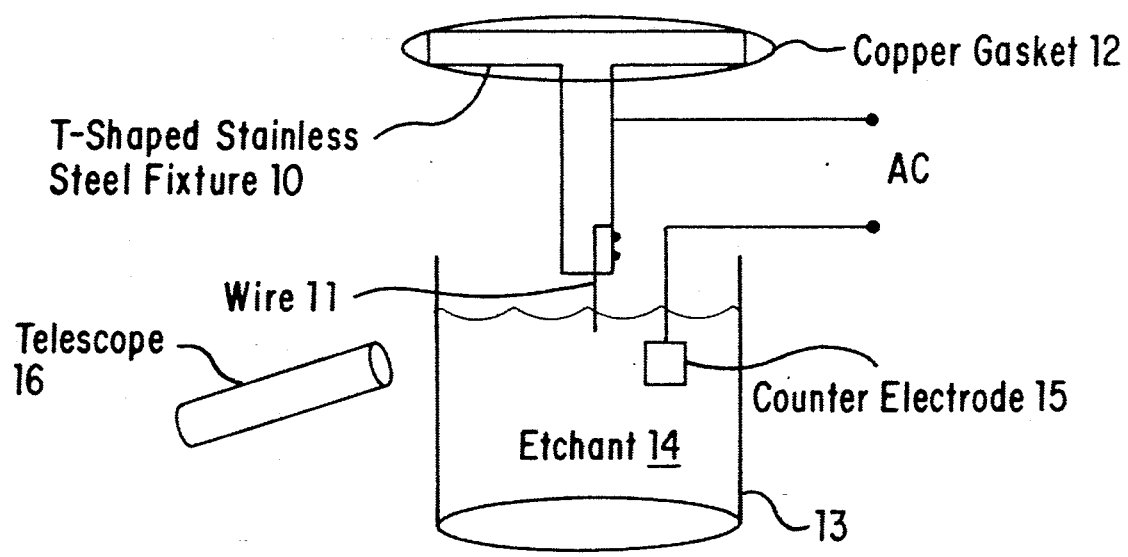
FIG. 1 schematically illustrates a bulk etch setup. Etchant for Pt/Ir tips by volume: 60% saturated $CaCl_2$, 36% $H_2O$, and 4% HCl. Etching conditions: 25 V rms ac against a C electrode.

FIG. 1 schematically illustrates a bulk etch setup useful for practicing the present invention. A T-shaped stainless steel fixture 10 serves as a carrier for the wire 11 to be etched. The fixture is suspended on a copper gasket 12 mounted on a ring stand (not shown) over a rectangular container 13 holding the etchant 14 bath. A Carbon counter electrode 15 is suspended in the bath, and the T-shaped fixture 10 and the counter electrode 15 are connected to a 60 cycle a.c. (house current) power supply (not shown). The choice of material for the counter electrode is not critical, with other suitable materials including lead foil and gold foil. A telescope 16 is used to monitor the progress of etching, typically at a magnification of 40×. We use a Nikon SMZ-2B stereo light microscope equipped with a fluorescent ring, 33×objectives and a zoom ratio of 6.3.

Figure 3:
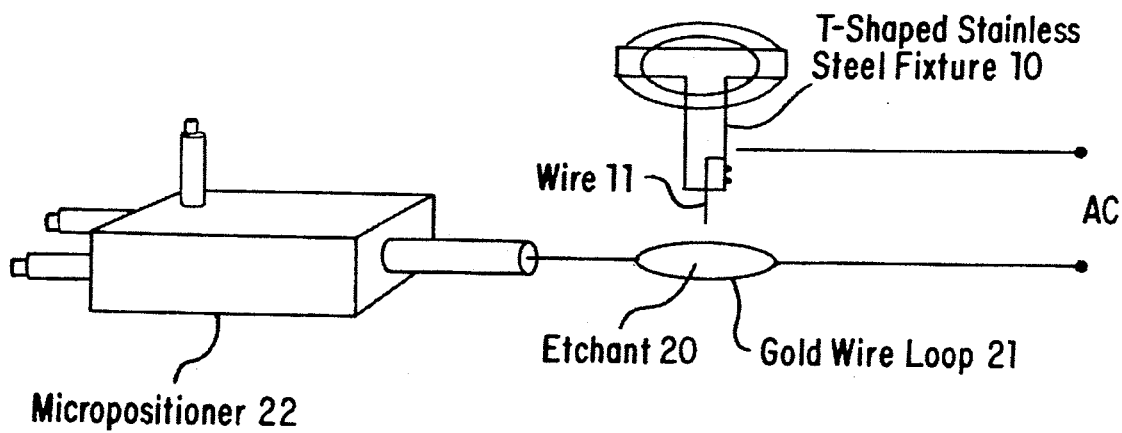
FIG. 3 schematically illustrates a micropolishing setup. Etchant for Pt/Ir tips by volume: 60% saturated $CaCl_2$, 36% $H_2O$, and 4% HCl. Etching conditions: 2 V rms ac against a Au electrode.

FIG. 3 schematically illustrates a micropolishing setup useful for practicing the present invention. The T-shaped stainless steel fixture 10 is the same as shown in FIG. 1, and likewise suspended on a ring stand. A thin film of etchant 20 is provided across the aperature of a gold wire loop 21, which aperature is about 2 millimeters in diameter. The wire loop is held by a micropositioner 22, which is in turn used to contact the film to the tip of the microelectrode. The micropositioner we use is a Model J RHFF micropositioned produced by the Line Tool Co. of Allentown, PA. The same telescope (not shown) employed in connection with the setup of FIG. 1 is used to monitor the polishing step, with the magnification typically set to 100×.

The apparatus shown in FIGS. 1 and 3 may be placed in a glove box (not shown) flushed with an $N_2$ z atmosphere to thereby carry out etching in a $CO_2$ free environment. We use a Terra Universal 1689-00 plexiglass glove box mounted on top of foam pads for vibration isolation and equipped with Iris ports (Fisher Scientific 11-391-103) for bare hand operation (though we wear latex gloves for protection) and an airlock unit to permit equipment exchange without disturbing the carbon dioxide free environment. The vent from a high pressure liquid $N_2$ tank is connected to the glove box, and nitrogen is introduced to the glove box and the glove box airlock unit through separate flow meters at a rate of 2 to 6 standard cubic feet per hour. Note that a high purity nitrogen source is used: standard grade nitrogen is not sufficiently pure because it contains too high a residual carbon dioxide concentration. A humidity indicator located inside the glove box is used to monitor the extent to which the glove box has been purged. A reading of less than 15% humidity is sufficient to begin tip fabrication under substantially $CO_2$ free conditions.

To further exclude $CO_2$ from the etching environment, all water used to prepare etchant solution and all water used to prepare rinse solutions for the electrodes following etching steps is boiled for one minute prior to use. After etchant and rinsing solutions are introduced into the glove box the percent humidity will rise above 15%, as expected, but carbon dioxide will not thereby be introduced into the glove box as long as the etchant and rinsing solutions have been rendered substantially carbon dioxide free by boiling.

The radius of curvature for tips produced by the procedures described herein is about 500 Å. This figure is based on an observed range of about 200 Å to about 800 Å for the radius of curvatures seen for tips produced by the procedures described herein. The tips produced by the procedures described herein are characterized by a substantially smooth surface on the end conical portion after the polishing step.

While apparatus suitable for manually carrying out the method of the present invention has been described above, it will be appreciated that these procedures can be carried out by other means, such as by automated means.

Tips disclosed herein may be used for the STM of high aspect ratio structures (i.e., structures having an aspect ratio greater than one), and particularly for the critical dimension metrology thereof. The term "aspect ratio" as used herein refers to the ratio of the depth dimension of a structure to the width dimension of a structure. For example, a groove having a depth greater than its width is a high aspect ratio structure. Examples of high aspect ratio structures include lithographically produced structures for integrated circuit manufacturing (e.g.: semiconductor lithography test patterns; photoresists formed on semiconductor substrates; etc.).

The following examples are provided to illustrate the present invention, and are not to be construed as limiting thereof.

EXAMPLE 1

Bulk Etching of Pt/Ir Tips

The Pt/Ir tips are formed in a two step process whereby the wire is first etched in bulk solution to obtain the basic shape (FIG. 1). A 1.25 cm long piece of 0.2 mm 80:20 Pt/Ir wire (Ernest F. Fullam, Inc.) is suspended ~1.5 mm into 60 ml of etchant solution consisting of saturated $CaCl_2/H_2O$/12 Molar HCl solution (60%/36%/4% by volume)[10]. The Pt/Ir wire is etched against a carbon rod at 25 volts root mean squared (rms) alternating current (ac) for ~3-4 minutes until vigorous etching has ceased and only a few bubbles emerge from the tip. If multiple tips are to be etched, the etchant must be periodically refreshed (e.g., every 10-15 tips) because the attack deteriorates as the chloride ion concentration is depleted with the formation of a platinum chloride complex.[18] After etching, the tip is rinsed in distilled water to remove the residual etchant solution.

Figure 2A:
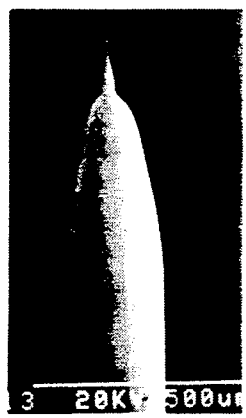
FIG. 2 a and b show SEM images of a Pt/Ir tip after bulk etching in a setup according to FIG. 1.
Figure 2B:

FIGS. 2(a) and 2(b) provide low and high magnification scanning electron microscope (SEM) images, respectively, of a Pt/Ir tip after the first etching step. The tip is comprised of a rigid structure with a long slender region just prior to the tip end [FIG. 2 (a)], which facilitates the fabrication of a high aspect ratio tip as will be described below.

EXAMPLE 2

Micropolishing of Pt/Ir Tips

Figure 4A:
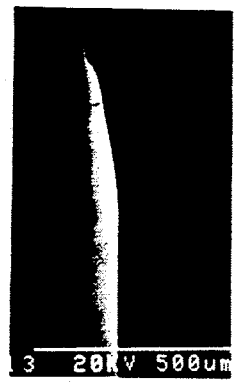
FIG. 4 a and b show SEM images of the same Pt/Ir tip shown in FIG. 2 after micropolishing in a setup like that of FIG. 3. Radius of curvature <500 Å. Cone half angle of 8°.
Figure 4B:
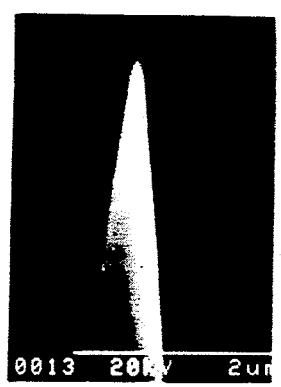

The second step involves precision micropolishing of the tip in a thin film of etchant[19-21] held in a Au wire loop (FIG. 3). An ac potential of 2 volts rms is applied between the tip and the loop. While watching through a stereo-microscope, the loop is raised and lowered with a mechanical micropositioner so that the film makes contact with the tip. The long slender region at the tip end [FIG. 3(a)] can be thinned by moving it through the film or sharpened by making brief contact with the film. After polishing, the tip is rinsed in distilled water. FIGS. 4(a) and 4(b) show low and high magnification SEM images, respectively, of the same Pt/Ir tip shown in FIG. 2 after micropolishing. Note the small radius of curvature (<500 Å), the high aspect ratio (8° cone half angle), and the smooth surface, features typical of all tips fabricated using this method. With use of the proper etchant, this micropolishing technique can be extended to other metals for the preparation of STM tips with a similar geometry.

EXAMPLE 3

Chemical Characterization of Pt/Ir Tips by Auger Electron Spectroscopy

Auger Electron spectroscopy (JEOL JAMP-30, 10 keV, $2.9 \times 10^8$ A probe current) obtained from one cut and from three electrochemically etched Pt/Ir tips were compared in order to assess the affect of electrochemical etching on the tip surface composition. Carbon was observed in all of the survey spectra. For the cut tip, Pt peaks were also observed defining the upper thickness of the carbon contamination layer to be between 20 and 50 Å. For two of the etched tips, however, Pt peaks were not observed suggesting that the surface carbon layer was in excess of the escape depth of the Pt Auger electron.

The relative thicknesses of the surface contamination layers for the cut versus the etched Pt/Ir tips were determined by monitoring the intensity of the uc Auger signal as a function of sputtering time (3keV, 25 mA emission current, $4 \times 10^5$ Pa Ar). For the cut tip, the C signal reached background after 45 s of sputtering, whereas the sputtering time varied from 30 s to 3 min for the three etched Pt/Ir tips. This large variation in C thickness among the etched tips was reflected in their STM imaging unpredictability. Out of 20 etched Pt/Ir tips, approximately 20% (those presumably with minimal surface C) successfully imaged sputter-deposited Au on Si and a Au-coated polymethylmethacrylate (PMMA) lithographic test pattern. Atomic resolution images of highly oriented pyrolytic graphite (HOPG) could not be obtained with these tips. The Au images acquired using the remaining 80% of the tips exhibited random noise spikes as well as streaks in the scan direction illustrative of intermittent discontinuity in the magnitude of the tunneling current.

EXAMPLE 4

Inhibiting Carbon Formation on Pt/Ir Tips

The low percentage of working STM tips required that the initial fabrication procedure be altered to improve the surface chemistry either by inhibiting C formation during electrochemical etching or by removing C following etching. With limited success, the thickness of the C layer was reduced using an ion mill or an oxidizing oxygen acetylene flame. Unfortunately, ion milling is a slow process requiring at least 30 min per tip.[9] Even with careful calibration of the flame temperature, it was difficult to consistently oxidize the C without altering the tip shape via melting and recrystallization. The extent of surface C remained unchanged after precautions were taken to remove all sources of solid C from the etching setup. Carbon contamination was reduced to the level observed for the cut Pt/Ir tip only after $CO_2$ was eliminated from the etching procedure. Carbon dioxide, which readily dissolves in water to form carbonic acid, has a higher vapor pressure than water and can therefore be eliminated by boiling and subsequently cooling all water used to rinse the tips and to prepare the etchant. During the micropolishing step, the contact of $CO_2$ in the air with the tip and with the thin film of etchant made it necessary to polish in a glove box under a $N_2$ atmosphere.

Auger survey spectra obtained from three tips in which $CO_2$ was removed from the etching environment compared favorably with that acquired from a cut tip. Platinum peaks were observed for all four tips demonstrating that the C layer for the cut and etched tips was thinner than the escape depth of the Pt Auger electron. A total of 35 s was required for the $Ar^+$ion beam to sputter away the C layer from the cut tip whereas a range of 25-50 s was needed for the etched tips.

It was also observed that tips that produced reliable images prior to SEM or Auger electron spectroscopy (AES) analysis routinely failed to provide a recognizable STM image after exposure to the electron beam. It is believed that residual hydrocarbon vapors in the SEM and AES vacuum systems are polymerized onto the STM tips by the electron beam.[5]

EXAMPLE 5

Image Aquisition with Pt/Ir Tips

Two sets of nine Pt/Ir tips, fabricated using the two-step etching procedure while taking precautions to remove $CO_2$, were tested by imaging sputter-deposited Au on Si. Noise spikes or streaks were not observed in the images acquired using tips from either set. The Au features in the images acquired using 80% of the tips (14/18) were normal in appearance with round agglomerates approximately 200 Å high ranging from 100 to 30 Å in diameter. The unusual features observed in the images acquired with the remaining 20% of the tips (4/18) were attributed to an undesirably tip shape rather than to problems with the tip surface chemistry.

Figure 5A:
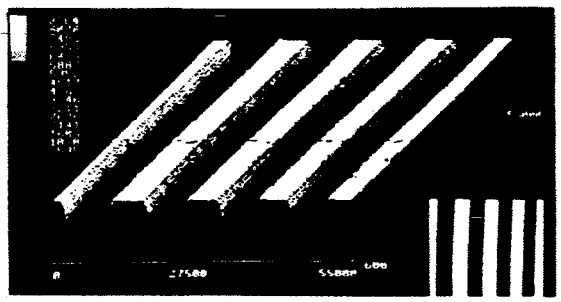
FIG. 5 a and b show an STM image (1 V, 1 nA, 5.5 ×5.5 μm ) of Au-coated PMMA lithographic test acquired with etched Pt/Ir tip. Grooves are ~0.75 μm wide and ~1 μm deep. Gray-scale height is in Å. (a) Three-dimensional view (center); top-down view (lower right). (b) Line scan.
Figure 5B:

Importantly, these etched tips can successfully image samples with large surface topography as is demonstrated in FIG. 5 (a and b) for a Au-coated PMMA lithographic test pattern (grooves 1 μm deep and 0.75 μm wide). The topview [FIG. 5(a), lower right] and linescan [FIG. 5(b)] illustrate that the widths of the groove tops and bottoms are approximately equal as measured by the tip. From the linescan [FIG. 5(b)], the finite width of the tip, which is convoluted with the slope of the groove sidewall, can be observed.

Figure 6A:
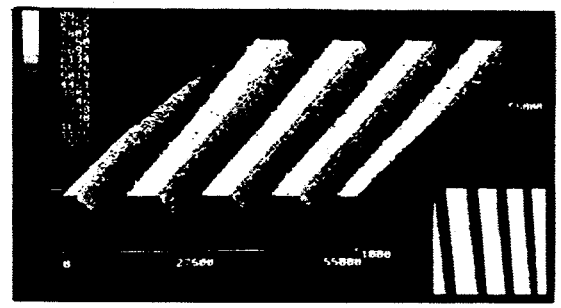
FIG. 6 a and b show an STM image (1 V, 1 nA, 5.5 ×5.5 μm) of the same Au-coated PMMA lithographic test pattern employed in FIG. 5 acquired with a mechanically cut Pt/Ir tip. Grooves are ~0.75 μm wide and ~1 μm deep. Gray-scale height is in Å. (a) Three-dimensional view (center); top-down view (lower right). (b) Line scan.
Figure 6B:
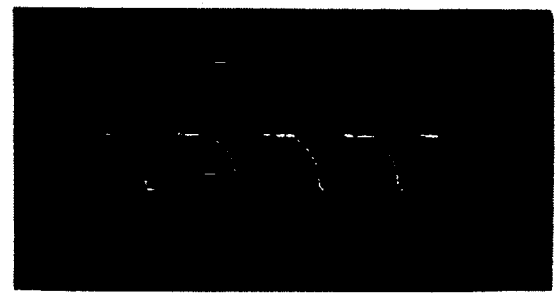

In contrast, FIG. 6 a and b show an STM image acquired from the same lithographic test pattern using a mechanically cut Pt/Ir tip. Although the cut tip can reach the groove bottom, providing an accurate measure of groove depth, the irregular shape and broadness of the cut tip is clearly incorporated into the STM image of the test pattern. In the image, the width at the bottom of the groove is only one third of the actual width of 0.75 μm [FIG. 6(a), lower right; FIG. 6(b)]. This striking comparison of STM images acquired from a highly topographic sample using Pt/Ir tips with dramatically different geometries clearly illustrates the importance of using a controlled geometry tip for the acquisition of reliable and reproducible images.

References

[1] D.A. Grigg, P.E. Russell, and T.A. Dow, in *Abstracts--Fifth International Precision Engineering Seminar and Annual Meeting of the American Society for Precision Engineering*, 1989, p. 25.

[2] R.A. Dragoset, R.D. Young, H.P. Layer, S.R. Mielczarek, E.C. Teague, and R.J. Celotta, Opt. Lett. 11, 560 (1988).

[3] M. Green, M. Richter, J. Kortright, T. Barbee, R. Carr, and I. Lindau, J. Vac. Sci. Technol. A 6, 428 (1988).

[4] A.M. Baro, L. Vazquez, A. Bartolame, J. Gomez, N. Garcia, H.A. Goldberg, L.C. Sawyer, R.T. Chen, R.S. Kohn, and R. Reifenberger, J. Mater. Sci. 24, 1739 (1989).

[5] A. Bartomlome, R. Garcia, L. Vazquez, and A.M. Baro, J. Microsc. 152, 205 (1988).

[6] B.A. Sexton and G.F. Cotterrill, J. Vac. Sci. Technol. A 7, 2734 (1989).

[7] E.W. Muller and T.T. Tsong, *Field Ion Microscopy, Principles and Applications* (Elsevier, New York, 1969).

[8] P.J. Bryant, H.S. Kim, Y.C. Zheng, and R. Yang, Rev. Sci. Instrum. 58, 1115 (1987).

[9] D.K. Biegelsen, F.A. Ponce, J.C. Tramontana, and S.M. Koch, Appl. Phys. Lett. 50, 696 (1987).

[10] A.A. Gewirth, D.H. Craston, and A.J. Bard, J. Electroanal, Chem. 261, 477 (1989).

[11] M.J. Heben, M.M. Dovek, N.S. Lewis, R.M. Penner, and C.F. Quate, J. Microsc. 152, 651 (1988).

[12] O. Nishikawa, K. Hattori, F. Katsuki, and M. Tomitori, J. Phys. Colloque (Paris) C6, 49, 55 (1988).

[13] H. Morikawa and K. Goto, Rev. Sci. Instrum. 59, 2195 (1988).

[14] D.K. Biegelsen, F.A. Ponce, and J.C. Tramontana, Appl. Phys. Lett. 54, 1223 (1989).

[15] H.W. Fink, IBM J. Res. Dev. 30, 460 (1986).

[16] R.J. Colton, S.M. Baker, J.D. Baldeschwieler, and W.J. Kaiser, Appl. Phys. Lett. 51, 305 (1987).

[17] I.H. Musselman and P.E. Russell, in *Microbeam Analysis*, edited by P.E. Russell (San Francisco, San Francisco, 1989), P. 535.

[18] C.T.J. Ahlers and R.W. Balluffi, J. Appl. Phys. 38, 910 (1967).

[19] F.W. Niemeck and D. Ruppin, Z. Angew. Phys. 6, 1 (1954).

[20] A.J. Melmed, Surf. Sci. 8, 191 (1967).

[21] A.J. Melmed and J.J. Carroll, J. Vac. Sci. Technil. A 2, 1388 (1984).

The discussion set forth above is illustrative of the present invention, and is not to be construed as limiting thereof. The invention is defined by the following claims, with equivalents of the claims to be included therein.

That which is claimed is:

1. A method of fabricating a double-tapered scanning tunneling microscope tip from a wire formed from platinum, iridium, or a platinum/iridium alloy, said tip comprising an elongate wire, and intermediate conical portion formed at one end of said elongate wire, and an end conical portion formed at the apex of said intermediate conical portion and axially therewith, with a tip formed at the apex of said end conical portion, said method comprising:
(a) immersing one end of the wire in a bath of an acidic aqueous etchant solution containing an alkaline earth salt, with the wire positioned substantially perpendicularly to the surface of the solution; and
(b) etching said wire in said bath to form said intermediate conical portion; and then
(c) ceasing said etching step while said tip is immersed in and in electrical contact with said bath so that said end conical portion is formed on said intermediate conical portion.

2. A method according to claim 1 wherein the wire has a diameter of from about 0.1 to about 0.5 millimeters.

3. A method according to claim 1 wherein the wire has a diameter of from about 0.20 to about 0.25 millimeters.

4. A method according to claim 1, wherein said free one end of said wire is immersed in said bath a depth of from about 1.5 to about 2.0 millimeters.

5. A method according to claim 1, which wire is formed from an alloy consisting essentially of 80% by weight platinum and 20% by weight iridium.

6. A method according to claim 1, wherein said alkaline earth salt is $CaCl_2$.

7. A method according to claim 1, wherein said etchant solution contains HCl.

8. A method according to claim 1, wherein said etchant solution is comprised of, by volume, 60% aqueous saturated $CaCl_2$ solution, 36%, $H_2O$, and 4% 12 Molar HCl solution.

9. A method according to claim 1, wherein said etching step is carried out in a carbon dioxide free environment.

10. A method according to claim 1, wherein said step (e) is carried out in a carbon dioxide free environment.

11. A method of inhibiting the formation of carbon on a scanning tunneling microscope tip during etching thereof, comprising:
(a) positioning said tip in an etchant solution, which tip is formed from platinum, iridium, or a platinum/iridium alloy; and then
(b) etching said tip while excluding carbon dioxide therefrom, wherein sufficient carbon dioxide is excluded to inhibit the formation of a contaminating carbon layer on said tip.

12. A method according to claim 11, wherein said etchant solution is substantially free of carbon dioxide.

13. A method according to claim 11 wherein said etching step is carried out in an atmosphere substantially free of carbon dioxide.

14. A method according to claim 11, wherein said etching step is carried out in an atmosphere consisting essentially of nitrogen.

15. A method according to claim 11, wherein said wire is positioned in said etchant solution by immersing the wire in a bath of etchant solution.

16. A method according to claim 11, wherein said etchant solution comprises an acidic aqueous etchant solution containing an alkaline earth salt.

17. A method according to claim 11, wherein said etching step is carried out in an atmosphere consisting essentially of an inert gas.

18. A method according to claim 17, wherein said etching step is carried out in an enclosed chamber, further comprising the step of purging the enclosed chamber to a humidity of less than 15 percent prior to said etching step.

19. A method according to claim 11, wherein said etchant solution is comprised of water which has been boiled to render said etchant solution sufficiently free of carbon dioxide to inhibit the formation of a contaminating carbon layer on said tip.

20. A method of fabricating a double-tapered scanning tunneling microscope tip from a wire formed from platinum, iridium or a platinum/iridium alloy, comprising:
(a) immersing one end of the wire in a bath of an acidic aqueous etchant solution containing an alkaline earth salt, with the wire positioned substantially perpendicularly to the surface of the solution; and
(b) etching said wire at about 25 volts root mean squared (rms) alternating current (ac) until a double tapered tip is formed; and then
(c) providing a thin film of a second acidic aqueous etchant solution containing an alkaline earth salt; then
(d) contacting said tip to said thin film; and then
(e) etching said tip at about 2 volts rms ac to thereby polish said tip.

21. A method according to claim 20, wherein said alkaline earth salt in said second etchant solution is $CaCl_2$.

22. A method according to claim 20, wherein said second etchant solution contains HCl.

23. A method according to claim 20, wherein said second etchant solution is comprised of, by volume, 60% aqueous saturated $CaCl_2$ solution, 36% $H_2O$, and 4% 12 Molar HCl solution.

24. A method of inhibiting the formation of carbon on a scanning tunneling microscope tip during etching thereof, comprising:
(a) positioning wire in an etchant solution, which wire is formed from platinum, iridium, or a platinum/iridium alloy; and then
(b) etching the wire while excluding carbon dioxide therefrom,
wherein said etching step is carried out in an atmosphere consisting essentially of nitrogen.

25. A method according to claim 24, wherein said wire is positioned in said etchant solution by immersing the wire in a bath of etchant solution.

26. A method according to claim 24, wherein said wire is positioned in said etchant solution by contacting the wire to a thin film formed from an etchant solution.

27. A method according to claim 24, wherein said etchant solution comprises an acidic aqueous etchant solution containing an alkaline earth salt.

28. A method of inhibiting the formation of carbon on a scanning tunneling microscope tip during etching thereof, comprising:
(a) positioning a wire in an etchant solution, which wire is formed from platinum, iridium, or a platinum/iridium alloy; and then
(b) etching the wire while excluding carbon dioxide therefrom,
wherein said wire is positioned in said etchant solution by contacting the wire to a thin film formed from an etchant solution.

* * * * *

UNITED STATES PATENT AND TRADEMARK OFFICE
CERTIFICATE OF CORRECTION

PATENT NO. : 5,085,746

DATED : 4 February 1992

INVENTOR(S) : Inga H. Musselman and Phillip E. Russell

It is certified that error appears in the above-identified patent and that said Letters Patent is hereby corrected as shown below:

On the Title Page

In the Abstract, paragraph 2, line 1, after "method" insert --of--.

Column 4, line 51, "$N_2z$" should read --$N_2$--.

Column 4, line 60, "$N_z$" should read --$N_2$--.

Column 6, line 11, "[FIG. 3(a)]" should read --[FIG. 2(a)]--.

Column 7, line 46, "100 to 30" should read --100 to 300--.

Column 8, line 66, "and" should read --an--.

Column 9, line 1, after "axially" insert --aligned--.

Column 9, line 34, after "36%" delete the comma.

Column 10, line 1, "claim 17," should read --claim 11,--.

Column 10, line 41, after "positioning" insert the word --a--.

Signed and Sealed this

Eighth Day of June, 1993

Attest:

MICHAEL K. KIRK

Attesting Officer

Acting Commissioner of Patents and Trademarks